May 9, 1972     R. B. HARTMAN     3,662,041
PROCESS OF PRODUCING OPTICALLY PROJECTABLE REPLICAS
OF PRESSURE COALESCIBLE FILM
Original Filed June 16, 1969     3 Sheets-Sheet 1

Inventor:
Robert B. Hartman by John N. Lewis Jr.
John W. Phippi
Nicholas Skovran
Attorneys Inventor:
Robert B. Hartman Attorneys Inventor:
Robert B. Hartman

United States Patent Office 3,662,041
Patented May 9, 1972

---

3,662,041
PROCESS OF PRODUCING OPTICALLY PROJECTABLE REPLICAS OF PRESSURE COALESCIBLE FILM
Robert B. Hartman, Bridgeport, Conn., assignor to Remington Arms Company, Inc., Bridgeport, Conn.
Continuation of application Ser. No. 838,007, June 16, 1969. This application Oct. 5, 1970, Ser. No. 78,168
Int. Cl. B29c 17/00; B29d 7/22
U.S. Cl. 264—1
2 Claims

ABSTRACT OF THE DISCLOSURE

A process for producing optically projectable replicas of surfaces of coins, meals, bullet specimens and the like wherein an opaque pressure coalescible coating is mounted on an elastic transparent film, the film being placed against the article and pressure applied thereto. A soft backing pad is used in applying pressure to the film. The minute interconnecting cells of the film are opaque until they are collapsed. The elastic film causes pressure to be applied to the coating so that the major and minor surfaces, together with gradations therebetween, will be replicated.

---

This application is a continuation of Ser. No. 838,007, filed June 16, 1969, itself a continuation of Ser. No. 515,-935, filed Dec. 23, 1965.

This application relates to a process of producing optically projectable replicas of coins, medals, engravings, ballistic specimens, machine surfaces, botanical specimens, etc., and to the equipment for producing such replicas.

In evaluating coin collections and other materials it is frequently desirable to make a record of the condition of the surface of the object which can be projected, as by a conventional slide projector, to permit study at high degrees of enlargement. By virtue of varying degrees of wear, scratches, etc., such a technique produces a characteristic fingerprint by which a particular coin can be identified among a number of other coins of similar date and design.

In the firing of most weapons, the setback of the cartridge case under firing pressure causes a pattern to be impressed by machining marks on the breech face of the weapon into the relatively soft metal of the head of the cartridge case and the base of the primer cup. This pattern is a characteristic signature of the breech face of the particular weapon in which the cartridge was fired. If replicas of such cartridge case heads can be optically projected at high degrees of magnification, the replicas serve as a valuable tool for identification and for presentation of the evidence before a jury. For example, such techniques might be used to establish that a cartridge case recovered at the scene of a crime bears markings identical to those found on a specimen cartridge fired in a firearm recovered from the person or property of a suspected perpetrator of the crime.

Similarly, it is often desirable to be able to compare the degree of surface finish of a machined object with an established standard or to have a permanent projectable sample of the structure of a leaf or other botanical specimen.

I have determined that, by the application of suitable techniques, I can produce such replicas by the use of a composite film comprising an opaque pressure coalescible coating which is mounted on an elastic transparent film. The pressure sensitive opaque coating comprises a multitude of minute interconnecting cells (similar to a sponge). As a result of diffusion, little light is transmitted through the coating. Under the application of mechanical pressure the minutes cells comprised in the coating are collapsed or the cell walls are laminated and lose their ability to diffuse light. Thus, the area to which pressure is being applied becomes more and more transparent. Where no significant pressure is applied, the cell structure remains intact and the coating retains its opacity. Within the limits of the pressure causing complete collapse and clarification of the coating, the degree of clarification is roughly directly proportional to the applied pressure.

Such a film is commercially available and is of the type shown in the U.S. patent to Bechtold, No. 2,957,791, patented Oct. 25, 1960, and other patents related thereto.

As will be more fully set forth hereinafter, I have found that optimum results are obtained by the use of such film with coatings of particular thickness and by the selection of backing material of particular characteristics. Use for my purpose is also facilitated by the application of a magneta or cyan dye which lightly tints the coated surface of the composite film as an aid to distinguishing the coated surface of the film.

I have had the best results in supporting the coin or other object to be replicated on a yielding backing pad, to prevent damage to the back face of the object, and placing the composite film over the object with the coated surface in contact with the object. Pressure is applied to the film and to the object by a deformable pressure pad which is capable of deforming into substantial conformity with all major and minor features of surface topography of the object. The applied pressure should be sufficient to produce substantially complete clarification of the film over those areas of the object standing out in highest relief. Average pressures in the region of 1,700 to 1,800 p.s.i. applied to the surface area of the object are sufficient for most coins and similar objects. Since most of the objects to be replicated involve both major and minor variations in surface topography, it is desirable that the replica reproduce both major and minor features by appropriate density variations on the composite film. For example, the lines of the hair on the head of a figure appear as fine ridges and grooves on a generally raised surface, while the contours of cheek and jaw bones involve gradual variations in the level of a generally raised area and details of the eye involve relatively deep depressions in an otherwise raised area. In order to produce a degree of shading in the replica which will accurately reproduce these surfaces, as well as scratches and wear marks on any of these surfaces, it is necessary to use, as backing for the multi-celled coating, a backing film of transparent elastic material with considerable resistance to stretching. When such a material is pressed into contact with the object to be replicated by a deformable pressure pad, it first contacts those areas standing up in highest relief and the application of greater pressure tends to stretch the film and bring it more nearly into conformity with the depressed areas. As a result, there is a pressure differential existing between those areas standing up in highest relief and those depressed areas which are bridged over by the film and in which the effect of tension in the film is to reduce the effective pressure acting to compress the coating. Although this pressure differential is not great, it is sufficient to produce a difference in the degree to which the coating has been rendered transparent, which difference is adequate to display the modeling of major features of surface topography without diminishing the ability to record minor detail within or adjacent to a major change in the surafce level.

The exact nature of the invention, as well as other objects and advantages thereof, will become more clearly apparent from consideration of the attached drawing, in which.

Figure 1:
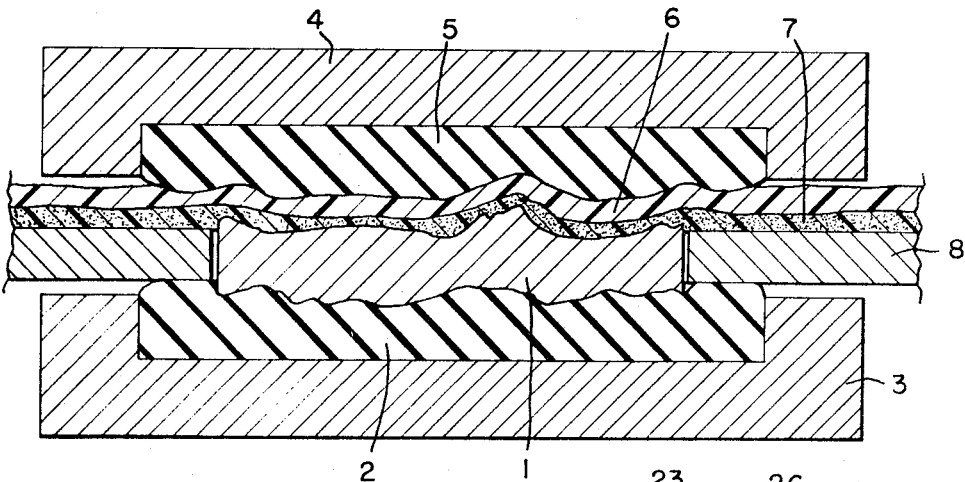
FIG. 1 is a cross-sectional view, not to a uniform scale, illustrating a segment of the opaque, pressure coalescible film under compression between a coil or similar object and a yieldable pressure pad, the object being supported on another yieldable backing pad to prevent damage to the back of the object.
Figure 1A:
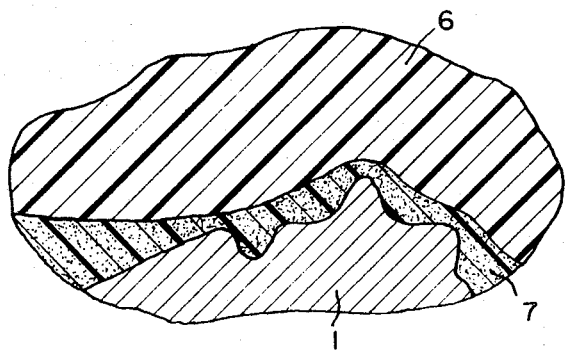
FIG. 1a is an enlarged fragment of FIG. 1.

Referring to the drawing by reference numerals, FIG. 1 illustrates, although not to scale, a coin 1, supported on a sulfur-free elastomeric backing pad 2, mounted on a stationary platen 3 of any suitable pressure applying device capable of applying an average pressure of at least 800 p.s.i. to the surface of the largest coin to be reproduced. The press is provided with a movable pressure applying platen 4 which is also fitted with a sulfur-free elastomeric pressure pad 5. To avoid lateral distortion of the pads, which tends to apply greater effective pressure to the center of the coin, both the backing pad and the pressure pad are preferably recessed into the surface of the platens.

An opaque pressure coalescible film of the type described in the Bechtold patent, above referred to, is under compression between the coin 1 and the pressure pad 5 which the film backing 6 in engagement with the pressure pad 5 and the coalescible film coating 7 in engagement with the coin. In the drawing the thickness of the backing film and of the coalescible coating is greatly exaggerated. Preferably the thickness of the film backing is about .002 inch and the thickness of the coalescible film coating is about .0004 inch.

As explained in the Bechtold patent, it is a characteristic feature of the opaque pressure coalescible films that whenever a sufficiently high pressure is applied the walls of the interconnecting pores in the coating are collapsed and the coating becomes relatively transparent. Varying pressure, below that which is sufficient to produce complete transparency, results in varying degrees of transparency of the coalescible coating.

Although it might seem that the yieldable pressure pad, applying substantially uniform pressure to the elastic backing of the film, would apply a substantially uniform pressure to the coating on the elastic film and to the surface of the coin or other object to be replicated, a surprising discovery was that a strong elastic backing film would tend to bridge across the low spots in a coin so that the coating could be brought into conformity with the face of the coin only as the result of elastic deformation of the backing film. The effect of tension in the film tends to increase the effective pressure on the coating in contact with the high spots of the coin and to decrease the effective pressure on that part of the coating over a low spot on the coin. As a result of this modulation of the effective pressure there is a graduation in the degree to which the film is clarified, which accurately reflects the major topography of the surface of the coin without interfering with the ability of the coating to at the same time time accurately reproduce scratches and minor surface detail impressed into the coin.

It is not necessary that the yieldable pressure pad be an elastic solid material, as any soft, fluid, semi-fluid, or viscous material would function as well to apply the pressure to the elastic film supporting the coating. Thus, the pressure applying media may be felt, water, oil, grease, putty, non-hardening modeling clay, or the putty-like elastic plastic siloxane derivative known as "bouncing putty" or "silly putty," if suitable precautions are taken to contain such material. However, a viscous or fluid material would cause problems of leakage and would tend to extrude out of the space between the press platens, so that it is functionally desirable to use a solid material secured to the platens of the press. Unless special precautions are taken, such as those illustrated in FIG. 11 to be later discussed herein, a rubberlike material can be used provided it is soft enough to deform into conformity with the surface of the object to be replicated under a lower average pressure than that required to cause clarification of the film and is relatively a thick member in comparison to the depth of any features molded in relief on the surface of the object to be replicated. To express it in another way, the volume of the rubberlike material must be substantially greater than the volume of the total of all of the depressions formed in relief in the surface of the object. For use with objects having no greater degree of relief than most U.S. coins and for use with the available grades of opaque pressure coalescible film, the yieldable pressure pad may conveniently be made of a sulfur-free elastomeric material such as "neoprene" synthetic rubber of a hardness of about 50 to 60 Durometer and a thickness of about 3/32". The preferred opaque pressure coalescible film has an elastic backing of .002" transparent polyester film and a pressure coalescible coating of about .0004" in thickness.

With these materials, I have found that when the pressure applied to the face of a typical United States coin, or other coin or object having a similar degree of relief, averages less than about 800 p.s.i., there is fair reproduction of macro features of the coin but micro features such as minor scratches, etc., are not well reproduced. At the other extreme, when the average pressure applied to the coin exceeds 3,200 p.s.i. the micro detail is exceptionally well reproduced but the contrast between macro features of varying height is not so clearly brought out as all of the high relief macro features become substantially transparent. Average working pressures of around 1,700 to 1,800 p.s.i. appear to offer the best compromise and permit sharp nearly grainless reproduction of micro features with quite adequate contrast between the reproductions of macro surface contours of different heights.

In the preceding paragraphs the references to average pressures are references to the total applied load divided by the area of the coin or other object being replicated. Because of the modulating effect of tension in the film, the pressure acting on the coating over the most elevated macro features is higher than the average pressure while the pressure acting on the coating over one of the most deeply depressed macro features is substantially less than the average pressure.

The use of sulfur-free elastomeric material for the backing pad is of particular importance for use with silver or other readily tarnished coins and similar objects, for most natural rubber contains a sufficient amount of sulfur to result in staining with a single application. Although the hardness of the backing pad is not important, so long as it is soft enough to avoid mechanical damage to the surface of a fine coin, these pads may conveniently be formed of the same material as the yieldable pressure pads.

The development of the differential pressure capable of realistically recording differences in the level of macro features of the modeling of a coin or similar object requires the use of a transparent backing film of substantial strength and yet one which is capable of conforming substantially to the surface of the object to be replicated.

I have found that a polyester film in a thickness of about .002 inch is a suitable material. I prefer the polyester film which is identified by the name "Mylar," a registered trademark of E. I. du Pont de Nemours and Company. This material has a yield strength of about 18,000 p.s.i. and an ultimate tensile strength of about 25,000 p.s.i. Other materials of similar characteristics having a yield strength of at least 15,000 p.s.i. and ultimate tensile strength of at least 20,000 p.s.i. can be used if the thickness of the backing film is between about .001 inch and about .004 inch. At lower thicknesses the film becomes mechanically difficult to handle, and at greater thicknesses excessive pressure would be required to satisfactorily record fine detail.

When desired, simultaneous records may be made of both faces of an object like a coin by sandwiching the coin between two thicknesses of the opaque coalescible film with the coalescible coating of each leaf of the film in engagement with the surface of the object.

For many applications it is desirable to surround the object while it is in the press with a mask 8 (see FIG. 1) which has a thickness about the same as that of the average thickness of the coin, cartridge head, or other object being studied. Otherwise there is a tendency for the elastic pressure pad 5 to draw the film down over the edges of the object, resulting in a permanent cupping, embossment or deformation of the film backing 6 supporting the coalescible coating 7. While such embossment does not detract from the faithfulness of the record produced, it creates some problems in mounting the finished film for uniform focus during examination by optical projection means. In extreme cases, the absence of such a mask may result in actually blanking out a disk from the film as the record is made so that, where practicable to provide a mask, it is desirable to do so. To the extent that the press platen applies pressure to the mask, it may be necessary to apply a greater total force to get an adequate average pressure on the object to be replicated.

Although as indicated, any press may be employed which is capable of applying the indicated pressure to the surface of the coin or other article, and to the mask where it is used, it has been convenient to employ simple cam or toggle operated hand presses such as those employed to actuate impression seals of the type used by notaries, corporate secretaries, etc.

Figure 2:
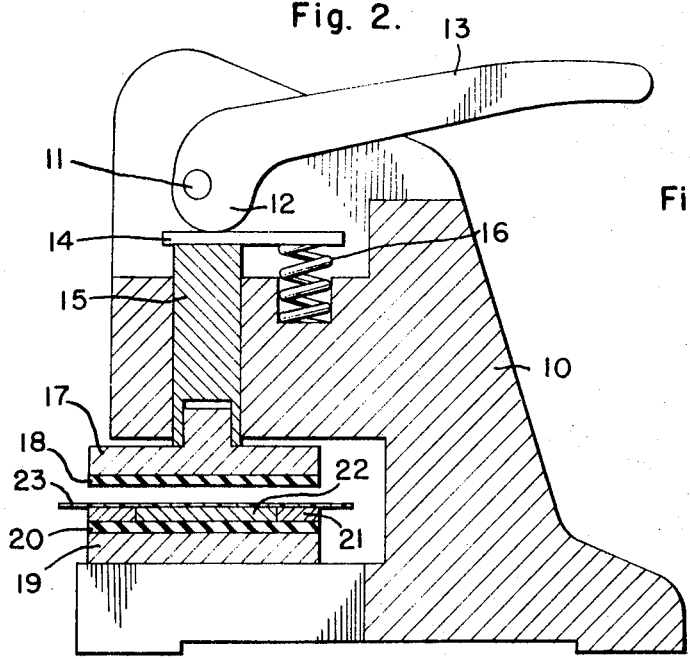
FIG. 2 is a cross-sectional view illustrating a hand-operated press utilized in practicing the process.

Such a press is illustrated in FIG. 2, wherein a frame 10 supports a pivot shaft 11 on which a cam 12 is actuated by a handle 13. The cam bears on a pressure plate 14 on the head end of a platen holding shaft 15 mounted for vertical movement in the frame. A return spring 16 also bears on the underside of the pressure plate to return the shaft to its upper position. An upper movable platen 17 is secured to the shaft 15 and is provided with a yieldable pressure pad 18 of an elastomeric material. A stationary platen 19, also provided with a yieldable pressure pad 20 of elastomeric material, is supported from the base of the frame in opposition to the upper platen. Between the platens there may be received a mask 21, the coin or other object 22 to be replicated, and the opaque, pressure coalescible film 23 may be supported on top of the coin with the coalescible coating in engagement with the surface of the coin.

Figure 3:
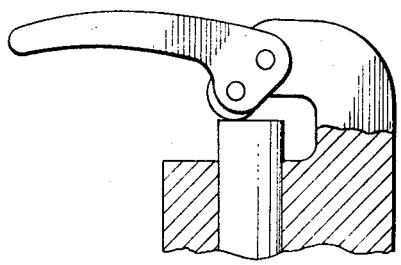
FIGS. 3, 4 and 5 are partial views similar to FIG. 2, showing alternative methods of applying pressure to the press platen.
Figure 4:
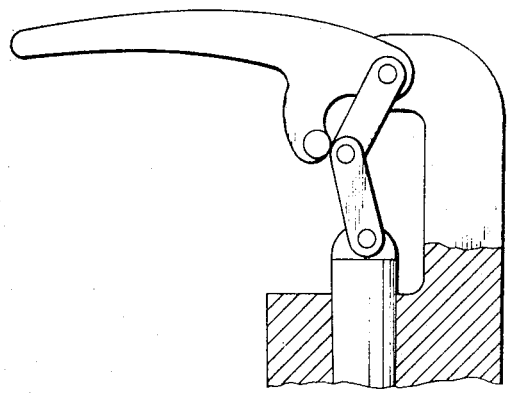
Figure 5:
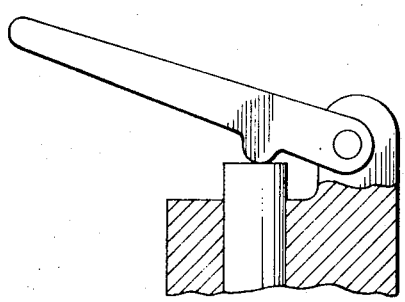

FIGS. 3, 4 and 5 illustrate alternative cam and lever arrangements for actuating a movable platen in such a press and are not believed to require any further description.

Figure 6:
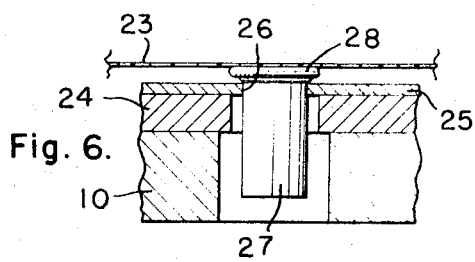
FIGS. 6, 7 and 8 are partial cross-sectional views illustrating object holding devices for the replication of cartridge heads and bullets.
Figure 7:
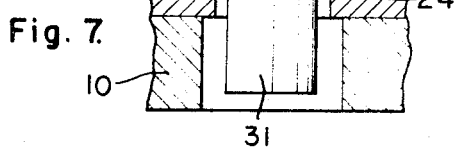
Figure 8:
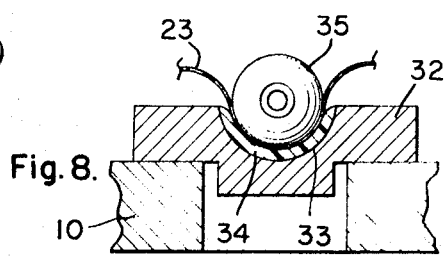

FIGS. 6, 7 and 8 illustrate lower platen arrangements which may be substituted for the lower platen 19 in a press of the type illustrated in FIG. 2 when used for the study of ballistic specimens. Referring particularly to FIG. 6, it can be seen that there is supported on the press frame 10 a lower die support plate 24 and a die plate 25 which may be provided with a multiplicity of holes 26 each of which is of the exact size necessary to receive the body 27 of a conventional rimmed cartridge case and support it by engagement of the rim 28 with the upper face of the die plate 25.

When it is desired to use this technique to provide replicas of the head of a rimless cartridge case, it is necessary to provide alternative means to support the cartridge case. In this case, referring to FIG. 7, the same lower die support plate 24 may be mounted in the frame and a die plate 29 is provided which has a U-shaped slot adapted to engage in the extractor cannelure 30 of a typical rimless cartridge case 31. For interchangeability, the die plate 29 may be formed somewhat in the shape of a coarse toothed comb with a number of such U-shaped slots, each adapted to receive a popular size of rimless cartridge case. To secure all-around support of the head of a rimless cartridge case, two die plates may be provided with matching semi-circular recesses.

To obtain replicas of the surface of a bullet, the techniques may be modified as shown in FIG. 8 to provide a lower die 32 having a semi-cylindrical groove 33 lined with an elastomeric material 34 and adapted to closely fit the rifling engaging portion of a bullet 35. The opaque, pressure coalescible film is applied between the elastomeric material 34 and the bullet, with the coalescible coating in engagement with the bullet. Pressure may be applied through a similarly shaped, elastomerically lined groove in a movable upper platen (not shown) and if desired a simultaneous record may be made of the upper half of the bullet by the use of another piece of opaque, pressure coalescible film. However, as a result of the parting line between the two die plates, positive identification is facilitated by the making of a second record with the bullet rotated about 90°.

Figure 9:
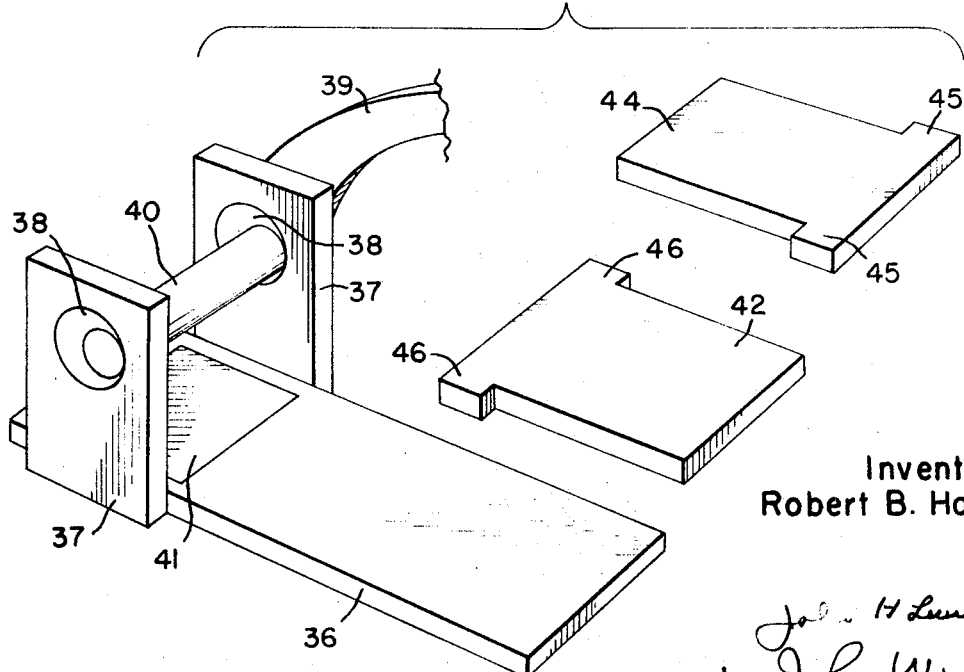
FIG. 9 is an exploded perspective view of an alternative form of press.
Figure 10:
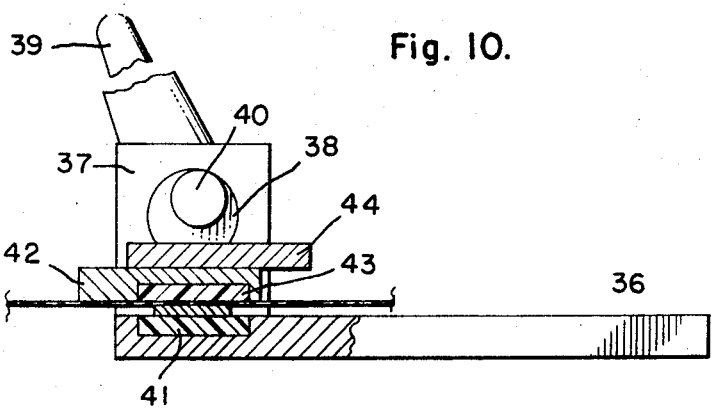
FIG. 10 is a cross-sectional view through the alternative form of press illustrated in FIG. 9.

Referring particularly to FIGS. 9 and 10, there is shown a simplified press for use particularly with coins and other relatively flat objects. Here a press bed 36 is provided with upstanding stanchions 37 in which a cam shaft 38 is journaled. A handle 39 provides for rotation of the cam shaft 38 and a cylindrical cam 40 is provided on the shaft between the stanchions. Recessed in the bed of the press is an elastomeric backing material 41 and a removable upper die 42 is similarly provided with a recessed elastomeric backing material 43. To accommodate coins of widely different thickness, a plurality of hardened spacer and pressure plates 44 may be provided in different thicknesses or shims may be provided for insertion between the plates 44 and the upper die 42. In use the various elements are assembled as shown in FIG. 10 and rotation of the handle 39 brings the cam 40 into engagement with the pressure plate 44 through which the force applied by the cam acts on the upper die 42 to compress the film which, as in the previous examples, is applied with the pressure coalescible coating in engagement with the object to be replicated. Ears 45 on the pressure plate 44 and similar ears 46 on the upper die 42 engage the stanchions 37 and prevent lateral movement of the upper die relative to the coin as the cam engages the pressure plate.

Figure 11:
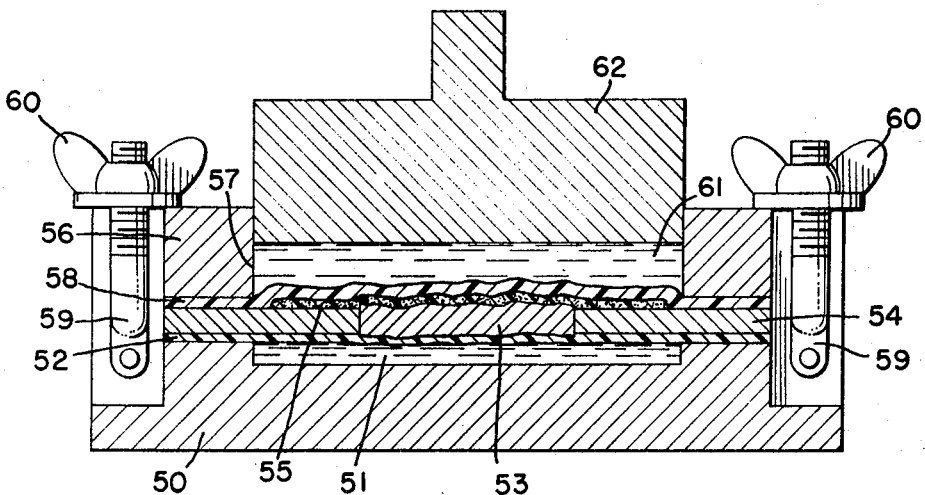
FIG. 11 is a cross-sectional view through an alternative form of die set capable of functioning with fluid or semi-fluid deformable pressure applying media.

I have referred previously herein to the possibility of using other than rubberlike materials as pressure applying media. FIG. 11 illustrates an alternative form of die set provided with means for containing a fluid or semi-fluid pressure applying medium. In purely functional terms this is probably the preferred modification, but the cost and complexity of construction makes it a less practicable form.

Referring to FIG. 11 by reference characters, a base 50 is recessed to receive a small quantity of a fluid or semi-fluid backing material 51 which is confined by a readily deformable membrane 52 which is secured to the edges of the base member by any suitable means. The coin 53 or other object to be replicated is supported on the membrane 52 and preferably surrounded laterally by a close-fitting mask 54 which overlays the base and lies on top of the membrane 52. As in the case of the other modifications previously described, the opaque pressure coalescible film 55 is placed over the coin with the coalescible coating in engagement with the surface of the coin. An upper die plate 56 is provided with a cylindrical opening 57 which may be closed on its bottom face with a deformable membrane 58 similar to the membrane 52. This die plate may for convenience be secured to the base temporarily by the pivoted clamp screws 59 and wing nuts 60 which engage in slots in the upper die plate to clamp the sandwich together with the deformable membranes acting as gaskets. The cylindrical opening in the upper die plate may be partially filled with a fluid or semi-fluid pressure applying medium 61 and a close-fitting piston 62 is provided which by any suitable device may be forced into the cylindrical opening to pressurize the fluid.

Although I have shown and described above various modifications of my invention, I do not consider that my invention is limited to that disclosure but instead extends to any devices or method coming within the scope of the appended claims.

What is claimed is:

1. A process of producing optically projectable replicas of coins and similar objects which includes the steps of:
   (1) supporting in facial engagement with the face of the object to be replicated, the coated surface of a composite material comprising an opaque pressure coalescible film, said film being composed of a hydrophobic organic addition polymer having a wholly carbon chain, a molecular weight of at least 10,000 and being taken from the group consisting of vinyl and vinylidene addition polymers and having an open-cell structure characterized by microscopic voids communicating with the surface, said film being capable of sustaining a change in cell structure to provide a clarification of opaqueness by application of mechanical pressure thereto, which film is mounted on an elastic transparent polyester film having resistance to stretching, said elastic transparent polyester film having a yield strength in the range of 15,000 to 18,000 p.s.i., tensile strength in the range of 20,000 to 25,000 p.s.i., and a thickness of 0.001 to 0.004 inch;
   (2) backing said elastic transparent film with a deformable pressure pad supported in a manner to prevent substantial deformation of the pressure pad in a plane parallel to the surface of the object to be replicated thereby preventing peripheral pressure drop-off and preventing drawing of said pressure coalescible film over the edge of the object with said pad being capable of deforming under compression normal to the surface of the object to be replicated into substantial conformity with the characteristic surface contours of the object to be replicated; and
   (3) applying a compressive force between about 800 p.s.i. and about 3,200 p.s.i. and at room temperature to said deformable pressure pad to conform said elastic transparent film into substantial, although not total, parallelism with the major features of surface topography of the object to be replicated, and to compress said pressure coalescible film between said elastic transparent film and the object to be replicated into substantially complete conformity with the major and minor features of surface topography of the object to be replicated creating areas of varying optical density due to the variation in the degree of pressure coalescence of the coalescible film.

2. A process as in claim 1, including the step of mounting said deformable pressure pad in a recess in a rigid platen through which the pressure is applied so that the side walls of the recess contain the pressure pad to prevent substantial deformation thereof in planes parallel to the surface of the object to be replicated.

References Cited
UNITED STATES PATENTS

| | | | |
|---|---|---|---|
| 520,283 | 5/1894 | Witz | 264—313 |
| 878,513 | 2/1908 | Emerson | 264—313 |
| 2,846,727 | 8/1958 | Bechtold | 264—321 |
| 2,957,791 | 10/1960 | Bechtold | 154—46 |
| 3,022,541 | 2/1962 | Passley et al. | 264—290 |
| 3,149,967 | 9/1964 | Bechtold | 96—36.3 |
| 3,244,777 | 4/1966 | Halpern | 264—69 |
| 3,311,692 | 3/1967 | Baird | 264—313 |

JULIUS FROME, Primary Examiner

A. H. KOECKERT, Assistant Examiner

U.S. Cl. X.R.

18—19; 264—292, 313, 321